(12) United States Patent
Liang et al.

(10) Patent No.: US 6,293,754 B1
(45) Date of Patent: Sep. 25, 2001

(54) METHOD AND APPARATUS FOR ALTERING THE PHYSICAL PROPERTIES OF FLUIDS

(76) Inventors: Thomas Li Liang, 117 Harvard St., Apt. 8, Cambridge, MA (US) 02139; Coach Wei, 1612 Worcester Rd., Apt. #606A, Framingham, MA (US) 01702

( * ) Notice: Subject to any disclaimer, the term of this patent is extended or adjusted under 35 U.S.C. 154(b) by 0 days.

(21) Appl. No.: 09/303,388

(22) Filed: May 1, 1999

Related U.S. Application Data

(62) Division of application No. 09/294,200, filed on Apr. 16, 1999.

(51) Int. Cl.[7] .................................................. B63H 1/18
(52) U.S. Cl. .................................. 416/1; 416/3; 416/500; 415/119; 440/49
(58) Field of Search ........................... 114/67 R; 415/10, 415/119; 440/49; 416/1, 3, 144, 145, 500

(56) References Cited

U.S. PATENT DOCUMENTS

| | | | |
|---|---|---|---|
| 4,170,185 | * | 10/1979 | Murphy et al. .................... 114/67 R |
| 5,735,226 | * | 4/1998 | McNeal .............................. 114/67 R |

* cited by examiner

*Primary Examiner*—Christopher Verdier
(74) *Attorney, Agent, or Firm*—Robert K Tendler

(57) ABSTRACT

A system for fluid processing is provided to control shear, point velocity and pressure in either a Newtonian or non-Newtonian fluid, which includes creation of three fields, namely a dynamic microshear field, a dynamic velocity field and a dynamic pressure field, with the fields being created by the injection of energy between 1 KHz and 10 MHz into the fluid. Control is achieved by control of the angle at which mechanical energy is delivered, steering and/or focusing of the energy, control of the amplitude of the energy waveform, of the energy, and control of the frequency of the energy in one embodiment to eliminate standing waves. By controlling the three fields, the system is able to control overall fluid behavior. In one embodiment, energy is injected into a fluid at any angle to the direction of flow assuming the fluid is flowing, with the injected energy providing a predetermined controllable zone of energy in the fluid at the region of energy injection. In another embodiment, the container itself is a transducer that acts as a processor, where the energy comes from the container itself. In a further embodiment, a phased array is used for electronically steering and focusing energy to any point within the fluid volume to provide for the desired shear, velocity and pressure distributions. Note that the direction and focusing of the injection of energy is turnable by physically moving a transducer or by the use of a phased array.

14 Claims, 5 Drawing Sheets

NOZZLE

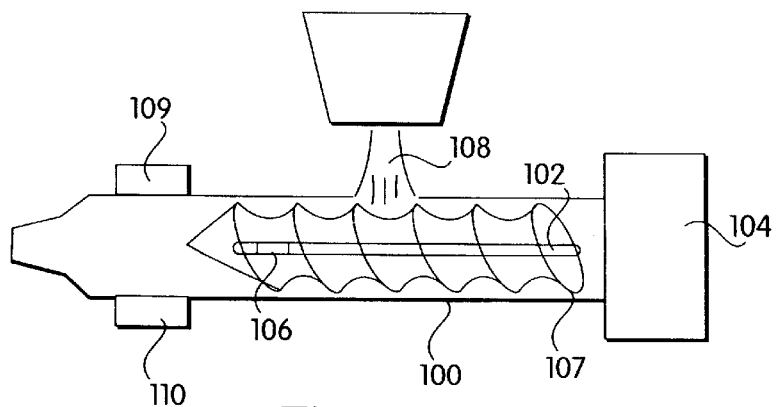
Fig. 10
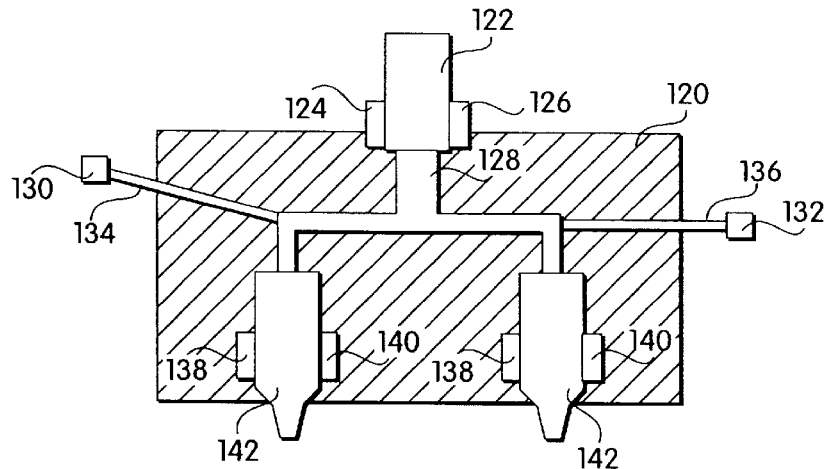
Fig. 11
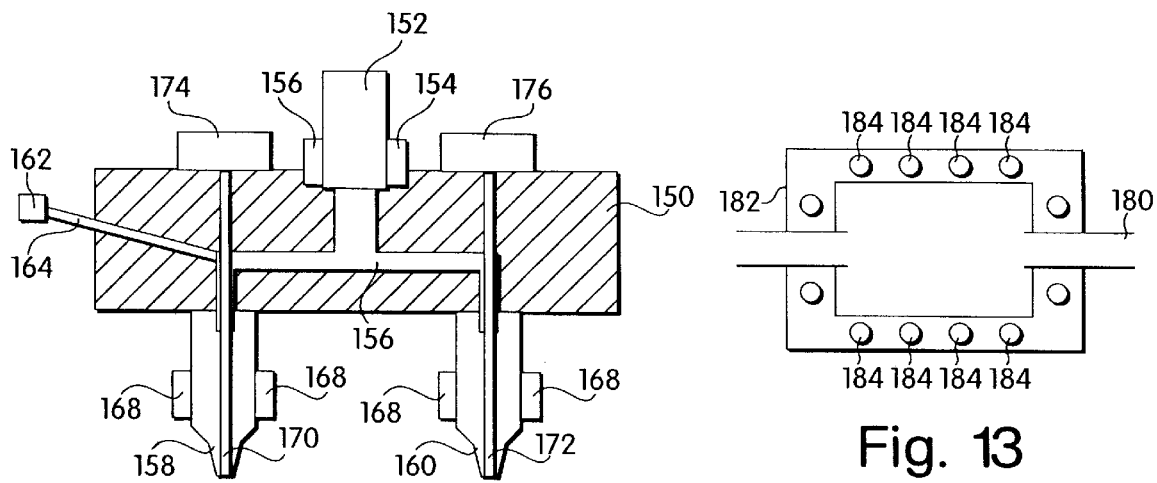
Fig. 12
Fig. 13

CAVITATION POINT, 209    Fig. 14B

CAVITATION POINT, 209    Fig. 15B

METHOD AND APPARATUS FOR ALTERING THE PHYSICAL PROPERTIES OF FLUIDS

This application is a divisional of U.S. patent application Ser. No. 09/294,220, filed Apr. 16, 1999, pending.

FIELD OF THE INVENTION

This invention relates to varying physical properties of materials and more particularly to a mechanical technique for controlling viscosity, point velocity and pressure of a fluid through the creation of predetermined dynamic microshear, velocity and pressure fields within a fluid.

BACKGROUND OF THE INVENTION

Fluid processing, particularly control of overall flow behavior, is vital to various industries. For example, how to make plastics melt to flow easily without degradation is the most crucial issue for plastics molding industry. The ability to transport crude oil is not only critical to these companies in that business, but also is critical to the whole society. In modern industry, fluids are extremely diverse in origin and composition, ranging, for example, from fermentation broths and food products to mineral slurries and polymer melts. However, underlying this diversity are certain properties that determine the overall flow behavior. These properties generally include viscosity, pressure, and velocity.

The viscosity of a fluid refers to its resistance to flow, i.e. the "stickiness" of the liquid. For instance, honey has a much higher viscosity than water. In general, the lower viscosity a fluid has, the more easily it will flow. Fluid is classified into two categories according to viscosity: Newtonian fluids and non-Newtonian fluids. A Newtonian fluid such as water has constant viscosity under a certain temperature. A non-Newtonian fluid refers to a fluid whose viscosity is variable under a constant temperature. Plastics melt, crude oil and pulp fall into this latter category. Pressure normally includes static pressure and dynamic pressure. Static pressure comes from gravity or external forces while dynamic pressure largely comes from a fluid's internal velocity inconsistencies. For non-Newtonian fluids, viscosity depends on both temperature and shear or "friction", which is influenced by dynamic pressure and thus velocity inconsistency. Although these properties influence each other, different applications pay more attention to some of them versus the rest.

Various conventional fluid processing techniques have been used to control these physical properties to satisfy industry needs. These techniques include using heat and shear for viscosity control, and using a pump for pressure control and also for velocity control. Though these techniques are widely used, they have their limits that they can not address all the needs, sometimes create problems, and are sometimes too expensive to use. These issues leave the door open for new fluid processing technologies.

By way of example, the petroleum industry is a huge industry that controls the lifeline of our society. The petroleum industry is composed of integrated oil companies and oil field equipment and services companies as well as pipeline, refineries and resellers. Due to the high cost of project implementation and competition, technology plays an important role in this industry.

As a result, fluid handling is a major issue in petroleum industry. Crude oils produced from wellbores are normally very viscous, which creates challenges for both oil recovery and oil transportation. To make this kind of oil flow through an oil pipeline, a high pressure has to be applied to the oil which has to be maintained throughout the entire pipeline. This is very costly and very inconvenient. The high viscosity of oil is one of the major reasons that so many pumping stations are required. An effective way to reduce viscosity would significantly reduce cost. In the past, as illustrated by U.S. Pat. No. 4,945,937, various attempts have been made to lower the viscosity of crude oil. Moreover, while this patent refers to the use of ultrasonic energy in such a process, it turns out that a wax crystal modifier must be added. Moreover, just adding energy to a tank does not significantly alter the physical characteristics of the fluid.

Moreover, a large problem for oil pipelines is oil spill caused by erosion. Localized high dynamic pressure is one of the causes of erosion. How to control dynamic pressure and thus prevent or deter severe erosion presently is an open question.

Another challenge comes from recovering viscous oil from oil wells. Some wells are filled with viscous petroleum liquids such as heavy crude oil and bitumen that makes them not pumpable with conventional pumping equipment. The high cost associated with well drilling makes it highly necessary to find new technologies to solve the problem.

As to papermaking, the paper industry is both energy intensive and capital intensive. The industry requires high capital outlays for mills and equipment. As a slowly moving industry, it is characterized by boom-and-bust periods. No company can respond instantly to increased demand, because construction of equipment and facilities takes at least four years to complete. There is thus a need for new technologies in paper industry.

The paper industry is faced with a number of problems and challenges. Pulp is the basic building block of paper and paperboard products. It is predominately made from wood. Wood pulp, like other types of pulp, is manufactured by separating the wood fibers which are held together by a material called lignin. The fibers can be separated by either mechanically tearing them apart or by chemically dissolving them.

Pulp handling, including manufacturing, transporting and processing, is central to the paper manufacturing process Pulp, with its viscous nature and other properties, requires sophisticated mechanical systems. The current manufacturing system requires large amounts of energy, which are costly and are not necessarily environmentally friendly. Lack of technology innovation makes the industry operate in a non-optimized way. As evidenced by U.S. Pat. Nos. 4,013,506, 5,213,662, 5,705,032, and 5,472,568 in the last 20 years, research has been done on how to handle pulp more efficiently. Still, new technology for pulp handling remains critical, especially with respect to energy and environmental concerns.

Not only are fluid handling efficiencies important to the paper making industry, in the marine field, propulsion and other problems are prevalent. Noise produced by a propeller is one of the sources that expose a submarine to detection. Noise is mainly caused by uneven pressure distribution, which causes a propeller to vibrate in an unwanted fashion. How to control the uneven pressure distribution and thus reduce noise is a challenge in this industry.

Another big concern is that of cavitation. The major problem encountered with cavitation is its violent nature. Upon the collapse of the vapor "cavities" produced by cavitation a small implosion occurs. These implosions can generate tremendous noise and can be violent enough to damage the blade sections, causing accelerated erosion of the blade surface. As well, the presence of the cavities often changes the performance of the blade section unfavorably.

For severe cavitation of a propeller under heavy load, the propeller can become substantially enveloped in cavitation causing thrust breakdown of the propeller and thus loss of thrust. Thrust breakdown is one of the factors that limits the maximum speed of a ship. Eliminating or alleviating the severity of cavitation will not only protect the propeller, but also opens the door for increasing ship speed. Cavitation occurs when the local pressure drops below the fluid vapor pressure. By the very nature of lifting surfaces, low-pressure regions occur on the foil surface that at sufficiently high loads will eventually cavitate. Once again, pressure control remains a question.

In another area, the brewing industry is a very old industry. Competition is intense due to its maturity and globalization, and how to lower manufacturing cost by reducing cycle time is thus important. Typically, the brewing process begins when the malt suppliers soak the barley grain in water, thereby facilitating germination. Then the mill uses steel rollers to crack the grain open before it enters the mash tun. In the mash tun, the malts are mixed with warm water. Thereafter, the result is pumped into a lauter tun, where it is sparged with hot water. This helps extract as much of the sugars from the malt as possible. The conversion of proteins and carbohydrates takes 30–60 minutes but the mashing procedure takes 2–3 hours. Then the base of beer is pumped into the brew kettle and moved to a fermentation cellar where it becomes beer. Fermentation may take several weeks or longer. Particle velocity plays an important role in how long each step will take. If particles are moving fast enough, the reaction can be made quicker and easier. To accelerate this process, control of particle velocity will help to accelerate the brewing process.

As to the plastics molding industry, viscosity plays a pivotal role. Traditionally heat and shear are used for viscosity reduction. These two methods can not always provide the required results. With the increasing acceptance of plastics in various engineering applications, there is a need for technologies that can overcome these problems.

The competitive advantage of the plastic molding industry lies in its ability to create complex geometric parts in a very short cycle time. To do this, molders must quickly force molten plastic into a mold and then rapidly cool it until it solidifies. The extent to which this can be done is largely related to viscosity. In general, the lower a material's viscosity, the more easily it will fill a mold. The standard means for lowering a polymer's viscosity is by applying either heat or shear. The effect of heat on viscosity can be seen from a common experience of heating honey to make it thinner. Shear is microscopically equivalent to the friction between molecules. The fact that pulling taffy will make it softer is an example of using shear to reduce viscosity. In a typical manufacturing process, electric heaters are used to control temperature and either an electric or a hydraulic machine is used to introduce shear by applying high pressure on plastics melts.

Unfortunately, with plastics, both methods have drawbacks and limits to their applicability. The problems with heat are a) Heat may cause material degradation; b) Heat can not be used in a mold since the mold must be kept cool; c) Some materials are not sensitive to heat. d) Using heat increases cycle time. Likewise, shear has these problems: a) It may break the molecular bonds and lead to material degradation; b) It requires sophisticated equipment; c) The shear effect happens only in localized small areas in the current manufacturing process.

As exemplified by U.S. Pat. Nos. 5,803,106 and 4,793,954, ultrasonic apparatus has been used to alter the flow rate of melts. However, these systems are not controllable in terms of the energy direction, energy focusing, the waveform of the energy, the amplitude of the energy or frequency, and thus offer only limited advantages. Also the energy injected into the fluid is only at the die orifice making it an extremely localized energy injection.

Another method not often used is to mix the original polymer with low molecular weight material. This usually lowers material strength and impacts end product properties. Due to these limits, there are a number of problems in the plastics molding industry that remain unsolved. Typical problems include: the mold filling problem in which one is unable to fill a mold. Secondly, there are part quality problems involving warping, blushing, material degradation, and melt fracture. There are also process problems involving material burning, and nozzle blocking. Difficulty in processing some large molecular weight materials also has caused problems, as has the incapability of meeting the demands of making large and complex parts. Finally, there is a lack of enough knowledge about viscosity control that makes current mold design provide low yield rates which translate into expense. Most of these problems can ultimately be attributed to high viscosity.

SUMMARY OF THE INVENTION

In order to solve the above pressing problems, a system for fluid processing is provided to control shear, point velocity and pressure in either a Newtonian or non-Newtonian fluid. The system includes creation of three fields, namely a dynamic microshear field, a dynamic velocity field and a dynamic pressure field. By dynamic is meant that the fields have time varying characteristics including intensity and distribution of the fields.

In one embodiment, the fields are created by the injection of energy between 1 KHz and 10 MHz into the fluid, with the frequency being controllable, with the amplitude being controllable, with the waveform of the energy being controllable, and with the direction of injection being controlled. Control is achieved by control of the angle at which mechanical energy is delivered, steering and/or focusing of the energy, control of the amplitude of the energy, the waveform of the energy, and frequency of the energy in one embodiment to eliminate standing waves.

By controlling these parameters, the three fields are simultaneously controlled, with the zone of energy being expanded over that described in U.S. Pat. Nos. 5,803,106, and 4,793,954. This zone is called the microshear zone and is controllable to provide a predetermined shear, velocity and pressure profile. The subject system is thus able to control overall fluid behavior by changing the physical properties of the fluid. In one embodiment, energy is injected into a fluid at any angle to the direction of flow assuming the fluid is flowing, with the injected energy providing a uniform and controllable zone of energy in the fluid at the region of energy injection. In another embodiment, the container itself is a transducer and acts as a processor, where the energy comes from the container itself. In a further embodiment, a phased array is used at the container or fluid conduit for electronically steering and focusing energy to any point within the container. Note that the direction and focusing of the injection of energy is turnable by physically moving a transducer or by the use of a phased array.

More specifically, a system is provided for altering the physical properties of fluids by the controlled injection of energy into the fluid. The system in one embodiment is used for controlling the dynamic pressure of a fluid by injecting the energy. In another embodiment the viscosity of non-Newtonian fluids is controlled by controllably injecting energy into the fluid. In another embodiment, for the plastics industry the injection of acoustic energy is used to delay the onset of crystallization.

Further, as to viscosity reduction, and in contradistinction to the teachings of U.S. Pat. Nos. 4,793,954 and 5,803,106, it has been found that successful results can be achieved by injecting the energy not substantially in the flow direction, e.g. outside of 15° of the flow direction. As mentioned above, one feature of the subject invention is the ability to control the physical properties of the fluid by controlling the direction in which the acoustic energy is projected into the fluid. Direction can be controlled either by physically moving the transducer or through the use of a phased array.

When the fluid is composed of long chain molecules, the physical properties are altered by the disentangling of the long chain molecules when the fluid passes through a zone of injected energy. The subject system can thus be utilized anywhere disentangling of long chain molecules is beneficial such as to create lower viscosity, to lower dynamic pressure, and to create laminar flow. In the molding industry, the subject system may be used for delaying crystallization by lowering the crystallization temperature, in some cases by as much as 10 degrees Fahrenheit.

In one embodiment, the energy projected into the long chain molecule provides a microshear zone throughout the material, which shear provides local activation energy at each molecule so that the long chain molecules disentangle and move away from adjacent molecules, thereby straightening the long chain molecules and reorienting them along the flow axis. The result of disentangling the long chain molecules is a reduction in viscosity without addition of heat and a delay of crystallization onset. The injection of energy can affect the nucleation process by delaying the formation of the nuclei and growth of the crystal. Additionally, the frequency of the energy is tunable which is especially useful in molding operations. In one embodiment the acoustic energy in the microshear zone is tunable between 1 KHz and 10 MHZ.

OIL TRANSPORTATION APPLICATION

The use of the subject invention in oil industry shows a picture of how to control the non-Newtonian fluid flow inside the pipelines. By steering the microshear field, the dynamic pressure field and the point velocity field, the viscosity of the crude oil can be reduced. This will lower the pressure requirement of oil transportation. In addition, the turbulence of the flow can be controlled by mapping the fluid pressure distribution with dynamic pressure that is generated by the system. Also, in the oil transportation where the static pressure is below the vaporization pressure, cavitation is formed. Cavitation becomes worse when turbulence flow exists. However, pressure drops usually occur locally. The locally formed small gas bubbles hit the boundary of the pipelines and locally erode the material of the pipelines and valves. Precise local control of pressure distribution can be used to reduce cavitation erosion.

INJECTION MOLDING APPLICATION

The use of the subject invention in the plastics industry provides a good example as to how varying physical properties of the fluid provides beneficial results. However, the example is only for illustrative purposes and the invention is not limited thereto. In order to control the viscosity of the molten material and to alter its crystallization temperature, in the subject invention a microshear field or zone is generated through the coupling of mechanically-generated energy into the apparatus which confines the molten material. For molding applications, the means coupling this mechanically-generated energy couples it either to the barrel, to the runners, or to the mold cavity itself. It is the purpose of the microshear zone to disentangle the long chain polymers, straighten them and thereby dramatically reduce the viscosity of the molten material without the addition of heat so high that it is deleterious to the process. In one embodiment, this energy is injected either transverse to or opposite the flow direction and is tunable in frequency to permit maximization of the particular process.

In one application, a two kilowatt acoustic or subacoustic generator is utilized operating between 1 KHz and 220 KHz, with the generator being frequency tunable. The tuning is adjusted in one embodiment so as to adjust viscosity for a given application such as for the barrel, runner or mold in a molding process so as to tailor the mechanical wave energy to the particular application.

As a result of the coupling of mechanical energy into the long chain polymer, the subject system provides an extended microshear zone throughout the entire volume of polymer in the vicinity of the transducer utilized to connect the generator device to the particular part involved. It has been found that the energy in the microshear zone is imparted to each of the long chain molecules and not in the case of molding just at the walls of the barrel as is the case with the friction-induced energy of the feedscrew. Note that in molding while high shear occurs at the walls of the barrel, the energy of this high shear is not transmitted to all of the long chain polymer molecules. In the subject system mechanical wave energy is imparted to all of the long chain molecules in the vicinity of the mechanical wave generator which alters physical characteristics of the polymer, such as lowering the overall viscosity of the material. Thus, all of the long chain polymers which pass through the microshear zone are disentangled, not just the ones at the wall of the barrel.

Importantly, it has been found that this disentanglement which causes the low viscosity is exhibited throughout the molding process, with the long chain polymers not becoming intertwined for periods of hours after the mechanical wave energy has been imparted to the molten material. Moreover, it has been found that crystallization temperatures of the polymer can be reduced by as much as 10 degrees Fahrenheit.

Thus, in one embodiment, the viscosity reducing system is provided for disentangling long chain polymers utilized in the molding process in which a zone of mechanically generated energy is provided either down stream of the hopper in the barrel utilized ahead of the mold, at the runners for the mold, or at the mold itself, with the mechanically-generated energy transferring a wave into the mold charge to provide a zone of high shear throughout the entire volume of material. The high shear provides activation energies so that the long chain molecules can disentangle and move away from adjacent molecules, thereby straightening the long chain molecules and reorienting them along the flow axis. The result of disentangling the long chain molecules permits reduction of the temperature of the mold charge such that the required viscosity can be achieved without application of additional heat.

Because no additional heat is required to achieve low viscosity the mold can be run colder so that the parts solidify in record time to reduce cycle time for the parts. Moreover, energy is saved. The reduction of the viscosity through the microshear process also permits easy filling of the mold by eliminating the increase in viscosity when a traditional mold charge meets the cold mold. Part quality is improved through the utilization of the microshear zones in which warping, blushing and discoloration due to the reduction in the change in temperature between the melt and the mold . This reduction in temperature change also results in reduced cycle times. Moreover, material degradation of the polymer is greatly reduced through the utilization of the microshear technique in which the prior problem of exceeding setup temperatures for the polymers is eliminated, and in which burning of the polymer from the heat applied to achieve low viscosity is also eliminated. With the subject microshear technique the melt is always kept within the process window, thus eliminating the problem of setting the temperature to the upper limit of the window. Moreover, the subject technique provides uniformity in the viscosity throughout the molding process. The subject process also permits the utilization of high-molecular weight polymers which have better mechanical properties but which are difficult to mold because high-molecular weight materials have higher viscosity's. Further, molten fracture is eliminated.

Additionally, it has been found that energy well below the ultrasonic range of 10 KHz to 900 KHz provides for significant viscosity reductions. This frequency in one embodiment is achieved through the speed at which mechanical vibrators vibrate which are not restricted to the fixed frequency of ceramics or piezoelectric transducers normally utilized. Moreover, it has been found rather than utilizing a single ultrasonic frequency, it is indeed important to be able to tune the mechanical wave source to provide different frequencies for different applications most notably to eliminate standing waves. Presently, frequency tunable piezoelectric transducers may be employed to provide frequency control.

Note that, the disentanglement of long chain molecules has application not only in the molding industry but also in any area in which viscosity is to be reduced. Moreover the injected energy in the subject invention may be in the flow direction when it is not important that the fluid pressure be controlled. For instance, while in the molding application it is important not to deleteriously affect the pressure of the injected molten material due to the utilization of ultrasonic or other enhancements which provide a forward pressure, in other applications such as food processing or lowering the viscosity of oil, the injected energy is effective not only when it is injected transverse to the flow direction but also slightly ahead of this direction.

Note also that, biological tissues can be completely disrupted by the application of ultrasonic energy. Ultrasonic energy has also found use in the depolymerization for viscosity control of synthetic and natural polymers. It is not however the purpose of the subject invention to break molecules apart as illustrated in U.S. Pat. Nos. 3,497,005 where ultrasonic energy is in fact utilized to break molecular bonds. Thus in the subject invention the energy injected is far below that which would result in the break up of molecular bonds.

BRIEF DESCRIPTION OF THE DRAWINGS

These and other features of the subject invention will be better understood in connection with the Detailed Description in conjunction with the Drawings, of which:

FIG. 10 is a diagrammatic illustration of an injection mold barrel showing the utilization of transducers about the exit end of the barrel and on the feedscrew utilized within the barrel to force molten material towards the machine nozzle;

FIG. 11 is a diagrammatic illustration of a manifold utilized in an injection molding process in which mechanical energy is injected both at the inlet to the runner in the manifold, along the runner itself and at the outlet nozzles of the manifold;

FIG. 12 is a diagrammatic illustration of the utilization of the subject system in a manifold in which valve pins utilized to control the flow of melt out through injection nozzles also provides for the injection of energy into the manifold;

FIG. 13 is a diagrammatic illustration of a fluid processor in the form of a container with embedded transducers for tailoring the physical characteristics of a fluid therethrough;

FIGS. 14B and 14C are graphs showing the pressure at the upper and lower surfaces of the propeller of FIG. 14A, illustrating a dip in the leading edge as illustrated at FIG. 14B for the upper surface of the blade, and a dip in the trailing edge of the blade of FIG. 14A, which dips in pressure distribution over the blade cause cavitation;

FIGS. 15B and 15C are respectively the pressure profiles at the upper surface of the blade of FIG. 15A and the lower surface of the blade of FIG. 15A, showing an increase in pressure at the leading edge of the propeller blade at the top surface and an increase on pressure at the lower edge of the propeller blade at its lower surface, thereby to provide positive pressure at the critical points of the blade to avoid cavitation.

DETAILED DESCRIPTION

Figure 1:
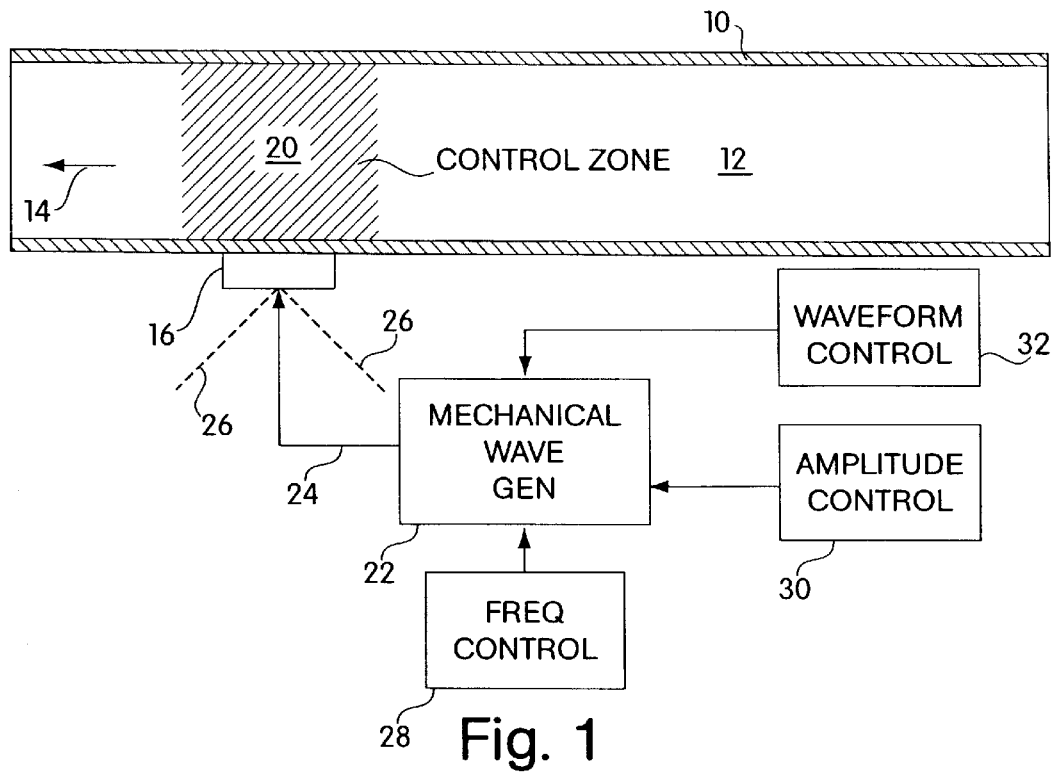
FIG. 1 is a block diagram illustrating the generation of a controlled zone of energy through the utilization of a mechanical wave generator, the output of which is frequency controlled, amplitude controlled, and waveform controlled, with the direction of energy injected into the fluid being controllable as well.

It will be appreciated that as part of the subject invention in order to alter the physical characteristics of a fluid, the injection of energy simultaneously affects three fields. These fields are the dynamic microshear, dynamic point velocity, and dynamic pressure fields. The energy introduced produces three coupled fields (in a 2-D coordinate system):

1. Dynamic Pressure Field, p(x,y,t).
2. Dynamic nicro-shear field, η(x, y, t).
3. Dynamic Point Velocity Field, v(x,y,t).

For an arbitrary point A located at (x,y):

$$p(x, y, t) = p_0 + p_d = p_0(x, y, t) + \sum_{i=1}^{N} p_{di}(x, y, t)$$

$$v(x, y, t) = v(p, \rho, x, y, t)$$

$$\eta(x, y, t) = \eta(v, \mu, x, y, t).$$

where:
- p(x,y,t) is the pressure at point (x,y).
- v(x,y,t) is the point velocity at point (x,y).
- η(x,y,t) is the shear rate at point (x,y). shear $\tau = \mu\eta$.

t is time.

$P_0$ is the initial pressure at point (x,y). Namely, the pressure before adding acoustic energy.

$P_d$ is the dynamic pressure generated from all the acoustic sources at point (x,y).

$P_{di}$ is the dynamic pressure generated from acoustic source i, i=1, . . . , N., N is the number of acoustic sources concerned.

ρ is density of the medium at point (x,y).

$\mu$ is the viscosity coefficient, which maybe a function of shear rate, depending on whether the fluid is a non-Newtonian fluid or a Newtonian fluid.

Explicit expressions of these three fields vary with the properties of the concerned medium. In some cases, not all of them can be solved currently. The detailed deduction of these three fields is shown in summary form below:

1. Dynamic Pressure Field Calculations

Suppose these are N acoustic sources. If the ith source is a point source, located at $(x_i, y_i)$. Assume $r_0$ is the distance from the point source where the reference pressure $P_{ri}$ is calculated. The pressure field radiated from this simple point source can be found in harmonic form as $$p_{di}(x, y, t) = \frac{r_0 p_{ri}}{\sqrt{(x-x_i)^2 + (y-y_i)^2}} \exp\left[j\left(wt - k\sqrt{(x-x_i)^2 + (y-y_i)^2}\right)\right]$$

If the ith source is a plane circular piston that is perpendicular to the x-y plane and whose center is at $(x_i, y_i)$. The radius of this piston is assumed to be $r_p$. The pressure field radiated from this circular piston can be found in harmonic form as $$p_{di}(x, y, t) =$$

$$\frac{p_{ri} \pi r_p^2}{\sqrt{(x-x_i)^2 + (y-y_i)^2}} \exp\left[j\left(wt - k\sqrt{(x-x_i)^2 + (y-y_i)^2}\right)\right] \left[\frac{2J_1(kr_p S)}{kr_p S}\right]$$

Where:
$J_1$ is the Bessel function of the first kind;

$$S = \frac{x - x_i}{\sqrt{(x-x_i)^2 + (y-y_i)^2}}$$

If the ith source is a line source that is perpendicular to the x-y plane and crosses this plane at $(x_i, y_i)$. The pressure field radiated from this simple line source can be found in harmonic form as $$p_{di}(x, y, t) =$$

$$\left(\frac{p_{ri}}{\sqrt{(x-x_i)^2 + (y-y_i)^2}}\right)^{\frac{1}{2}} \exp\left[j\left(wt - k\sqrt{(x-x_i)^2 + (y-y_i)^2}\right)\right]$$

If this line source has a certain width, say a, then its pressure field can be expressed as $$p_{di}(x, y, t) = \frac{p_{ri}}{\sqrt{(x-x_i)^2 + \left(y-y_i-\frac{a}{2}\right)^2}} \times \frac{\sin\left(\frac{ka}{2} \frac{y-y_i-\frac{a}{2}}{\sqrt{(x-x_i)^2 + \left(y-y_i-\frac{a}{2}\right)^2}}\right)}{\frac{ka\left(y-y_i-\frac{a}{2}\right)}{2\sqrt{(x-x_i)^2 + \left(y-y_i-\frac{a}{2}\right)^2}}} \times \exp\left[wt - kr - \frac{ka\left(y-y_i-\frac{a}{2}\right)}{2\sqrt{(x-x_i)^2 + \left(y-y_i-\frac{a}{2}\right)^2}}\right]$$

If the ith source is a linear phased array that is perpendicular to the x-y plane and whose center is located at $(x_i, y_i)$., this linear array has M elements. Each element has a width of a. The distance between adjacent elements is d. The time delay for firing adjacent elements is $\Delta t$. The pressure field radiated from this linear phased array can be found in harmonic form as $$p_{di}(x, y, t) = \left(\frac{p_{ri}}{r}\right)^{\frac{1}{2}} \frac{\sin\frac{kas}{2}}{ks/2} \frac{\sin\left(\frac{w\Delta t - kds}{2}N\right)}{\sin w\Delta t - \frac{kds}{2}} \times$$

$$\exp\left[j\left(wt - kr - \frac{(N-1)(w\Delta t - kds) - kas}{2}\right)\right]$$

$$\text{where: } s = \frac{y - y_i - [(M-1)d + a]/2}{r}$$

$$r = \sqrt{(x-x_i)^2 + (y - y_i - [(M-1)d + a]/2)^2}$$

In particular, if a is very small, the above expression can be simplified as $$p_{di}(x, y, t) =$$

$$\left(\frac{p_{ri}}{r}\right)^{\frac{1}{2}} \frac{\sin\left(\frac{w\Delta t - kds}{2}N\right)}{\sin\frac{w\Delta t - kds}{2}} \times \exp\left[j\left(wt - kr - \frac{(N-1)(w\Delta t - kds)}{2}\right)\right]$$

In the above equations:
w is the angular frequency.
$P_{ri}$ is a reference pressure for the ith acoustic source, which can be calculated by $$p_{ri} = \sqrt{2\rho c \frac{P}{A}},$$

where $\rho c$ is the multiplication of the density and wave speed.

$$\frac{P}{A}$$

is the division of power by area, which is wave intensity. This equation shows that control of power results in a control of pressure magnitude.

Using the equations shown above, the synthetic pressure field can be calculated according to $$p(x, y, t) = p_0 + p_d = p_0(x, y, t) + \sum_{i=1}^{N} p_{di}(x, y, t)$$

Furthermore, two-dimensional arrays, angular arrays, and the like, can be constructed and utilized. The theory for calculating dynamic pressure field follows the same equations as above. Based on the equations shown above, the pressure field can be calculated.

2. Dynamic Velocity Field Calculation

The Dynamic Velocity field is expressed as follows:

$$v(x, y, t) = v_0(x, y, t) + \frac{p_d(x, y, t)}{Z}$$

Where Z is the acoustic impedance of the fluid. It is usually a complex number. In some cases $Z=\rho c$.

3. Dynamic Microshear Field Calculation

The Dynamic Microshear field is expressed as follows:

$$\eta(x, y, t) = \frac{\partial v(x, y, t)}{\partial y} = \eta_0(x, y, t) + \frac{1}{Z} \frac{\partial p_d(x, y, t)}{\partial y}$$

With respect to the control of the three coupled fields, the intensity of the dynamic pressure field, the dynamic velocity field and the dynamic micro-shear field can all be controlled in real time by controlling the following parameters of acoustic sources: Distribution of Acoustic Sources; Power of Acoustic Sources; Frequency of Acoustic Sources; Number of Acoustic Sources. Further, by varying the time characteristics of the input that excites the acoustic sources, the time characteristics of these fields can be changed. All these can be done in real time. Furthermore, varying the time delay in firing different acoustic sources can vary the distribution of these three fields in real time. One example is the phased array. The phased array is capable of steering and focusing acoustic beams, which can be controlled electronically. The following equations states a time delay $\Delta t$ between adjacent elements will lead to a steering of an acoustic beam at an angle of (for a linear phased array)

$$\alpha = \sin^{-1}\left(\frac{c\Delta t}{d}\right).$$

It follows that one can steer the acoustic beam at arbitrary angle $\alpha$ by firing adjacent element in a linear phased array at a constant time delay of $$\Delta t = \frac{d\sin\alpha}{c}.$$

Varying time delay can also lead to dynamic focusing. In order to focus acoustic beam at a distance F to the center of the linear array while steer at an angle of $\alpha$, one can set time delay for firing the ith element at $$\Delta t_i = \frac{F}{c}\left\{1 - \left[1 + \left(\frac{d}{F}(n-\delta)\right)^2 - 2\sin\alpha\frac{d}{F}(n-\delta)\right]^{\frac{1}{2}}\right\} -$$

-continued $$\frac{F}{c}\left\{1-\left[1+\left(\frac{d}{F}\delta\right)^2-2\sin\alpha\frac{d}{F}\delta\right]^{\frac{1}{2}}\right\}$$

where:

M: number of elements in the linear array.

$$\delta = \frac{M}{2},$$

if M is an even number, $$\delta = \frac{M-1}{2},$$

if M is an odd number.

F: focal length from center of the array.

α: focus angle from the line perpendicular to the linear array.

i: element index, i=0,1,2, . . . , M −1.

d: center-to-center element spacing.

CONTROL OF THE SHEAR, VELOCITY AND PRESSURE FIELDS

Having set forth the interrelationship between the shear field, the velocity field, and the pressure field, it can be seen that varying the distributions in one or more of these fields has an effect on the other of the fields. What is now set forth is an explanation of how the control of the three fields permits improvements for such a wide variety of applications as ultrasonic cleaning, fluid transport for the petroleum industry, and treatment of material utilized in the injection molding process.

Referring now to FIG. 1, a conduit 10 contains a flowing fluid 12 which is flowing as illustrated by arrow 14 adjacent a transducer 16 which couples mechanical energy into the fluid so as to provide a controlled zone 20 where the physical properties of the fluid flowing through the zone are altered by the injected energy.

The energy is generated by one of a variety of mechanical wave generators 22 which is coupled as illustrated at 24 to transducer 16. The angle at which this energy is injectable in to the fluid is variable as illustrated by dotted lines 26 so that, in one embodiment, the energy may be injected transverse to the flow direction, in the flow direction or against the flow direction.

While the direction of energy injection is one example of how injected energy can be utilized to vary the three coupled fields, the three coupled fields can be controlled by the frequency of the mechanical wave energy as illustrated by frequency control unit 28. Likewise, the amplitude of the mechanical wave energy can be controlled as illustrated by amplitude control unit 30, whereas the waveform of the mechanical wave energy can be controlled as illustrated by waveform control unit 32.

There are thus four ways illustrated for controlling the injected energy so as to provide the desired field distribution in the conduit, thereby to modify the physical characteristics of the fluid flowing in the conduit in a predetermined manner.

Figures 2A, 2B:
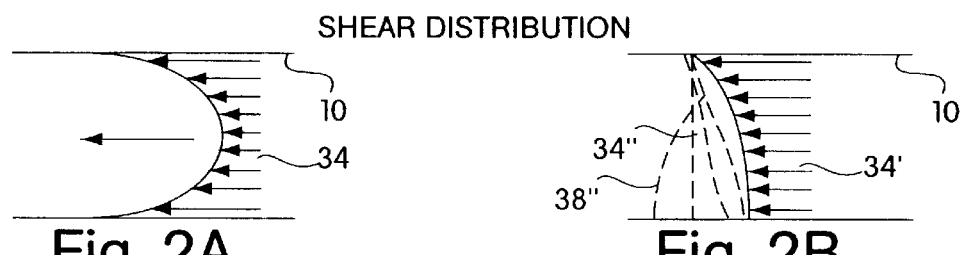
FIGS. 2A and 2B are diagrammatic illustrations of the shear distribution of a fluid within a conduit respectively without the introduction of energy and with the introduction of energy, illustrating how the shear distribution field can be tailored depending on the energy injected.
Figures 3A, 3B:
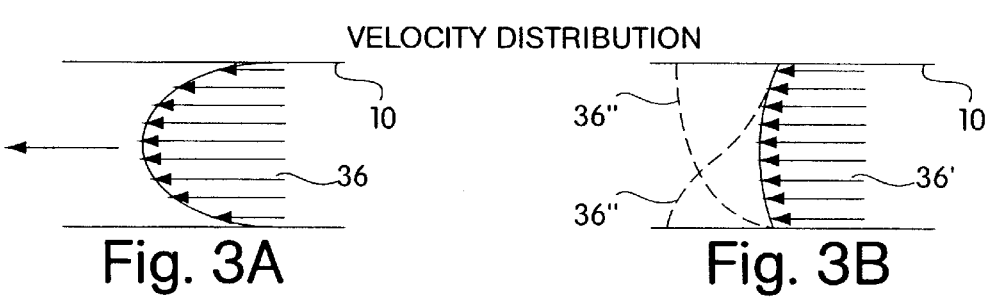
FIGS. 3A and 3B are diagrammatic illustrations of the velocity distribution field respectively without the introduction of energy and with the introduction of energy, showing how the velocity distribution field can be tailored depending on the energy injected.
Figures 4A, 4B:
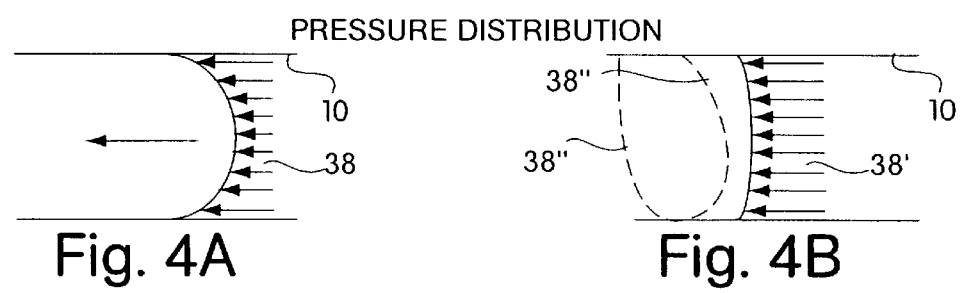
FIGS. 4A and 4B are diagrammatic illustrations of the pressure distribution field respectively before injection of energy and subsequent to the injection of energy showing how the pressure distribution field can be tailored depending on the energy injected.

As can be seen in FIGS. 2A, 3A and 4A, for conduit 10 a typical shear distribution is illustrated at 34 in which shear is greatest at the sidewall of conduit 10 and virtually non-existent in the center of the conduit.

As can be seen at 36, in terms of velocity distribution, the velocity is strongest at the center of the conduit and almost non-existent at the sidewall of the conduit.

As illustrated at 38, the pressure distribution is cusp-shaped such that while there is significant pressure along the center line of the conduit, more pressure exists at the sidewall of the conduit. This shear, velocity and pressure distribution is typical for fluids in a conduit without the introduction of mechanical wave energy.

Referring now to FIGS. 2B, 3B and 4B, it can be seen that with the introduction of energy the various distributions can be affected. The distributions can be affected to give a static field distribution as illustrated by the dotted lines in these figures; or the distributions can be made to vary in real time. For instance, and as will be described, for introduction of energy transverse to the flow direction, the shear distribution 34' can be altered so that a more uniform shear zone appears across the conduit, whereas the velocity distribution can be made more uniform across the conduit as illustrated at 36'. Likewise, as illustrated at 38', the pressure distribution can be made essentially uniform across the extent of the conduit.

It is the purpose of the subject invention through the controlled injection of energy into the fluid that the shape of the various distributions can be altered as illustrated by dotted lines 34', 36" and 38". What will be appreciated, and as will be explained hereinafter, it is possible to tailor the shear, velocity and pressure distributions for a particular purpose.

Figure 5A:
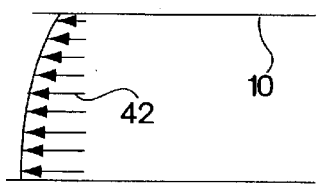
FIGS. 5A and 5B are respectively graphs showing the corresponding shear distribution field and velocity distribution field for creating cavitation useful in cleaning.
Figure 5B:
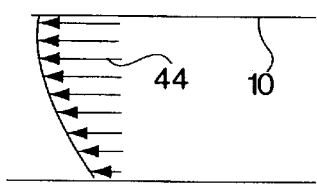
Figure 5C:
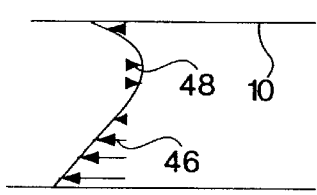
FIG. 5C is a graph showing the desired pressure distribution field for creating cavitation useful in cleaning.
Figure 5D:
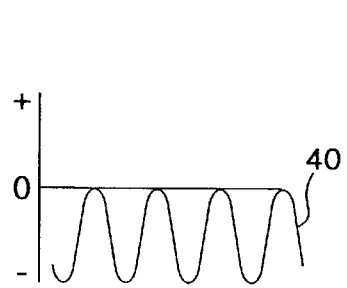
FIG. 5D is a graph showing the waveform of the mechanical energy injected into the fluid, illustrating oscillations in the negative direction from a zero established by the surface of a piezoelectric transducer at rest.

Referring now to FIGS. 5A, 5B and 5C, it is possible to tailor the configurations of the shear, velocity and pressure distributions so as to promote cavitational cleaning when energy is introduced in the manner illustrated in FIG. 5D. What can be seen is that through the introduction of only negative going oscillations as illustrated in FIG. 5D via waveform 40, a new shape is imparted to the shear distribution as illustrated at 42, the velocity distribution as illustrated at 44 and the pressure distribution as illustrated at 46.

Referring to the pressure distribution, it can be seen that at a certain point within conduit 10 the pressure goes negative at 48 thereby to promote cavitation as opposed to inhibiting cavitation. In one operative example, sinusoidal energy applied to a transducer between 0 and −5000 volts produces significant ultrasonic cleaning through the alteration of the physical properties of the fluid in the zone of energy produced by the transducer.

Figure 6A:
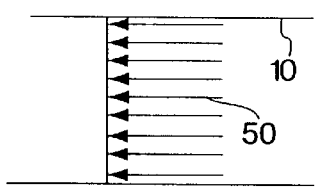
FIGS. 6A is a graph showing the desired shear distribution in a mold filling application.
Figure 6B:
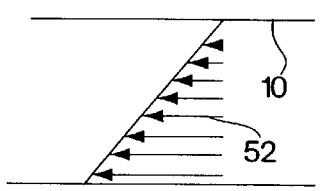
FIGS. 6B and 6C are graphs illustrating the corresponding velocity distribution and pressure distribution in a mold filling application.
Figure 6C:
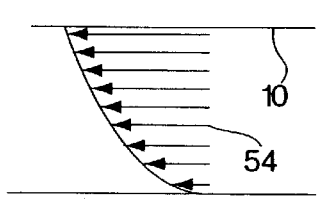

In order to promote mold filling, a different type of distribution pattern is required. As illustrated in FIGS. 6A, 6B and 6C the desired distribution pattern is illustrated by shear distribution 50, velocity distribution 52 and pressure distribution 54. Here the shear is maintained uniform across the cross section of conduit 10 so as to, for instance, add energy uniformly to reduce viscosity, while at the same time providing that the onset of crystallization of some of the materials be delayed.

Figure 6D:
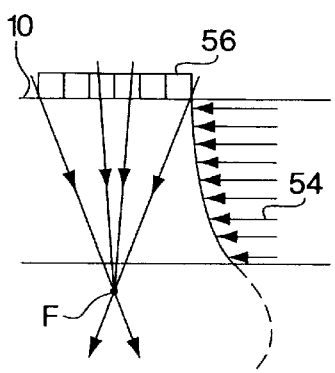
FIG. 6D is a diagrammatic illustration of how the pressure field can be altered through the focusing of the energy from a phased array to provide the required distributions for shear, velocity, and pressure to maximize mold filling requirements.

This type of distribution can be achieved through a phased array of transducers illustrated at 56 in FIG. 6D which focuses the energy to a focal point F that is exterior of conduit 10. This focusing effect produces a pressure distribution such as illustrated at 54 which in turn provides for the alteration of other two desired coupled fields.

What is accomplished by this arrangement is that the near field of the energy covers the entire cross section. It should be noted that in order to focus at a point outside of the conduit the array must be large enough, with the time delays calculated by the formula set forth hereinabove.

Figure 7A:
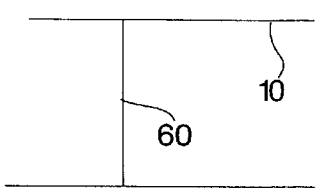
FIG. 7A, 7B, and 7C are graphs showing the shear, velocity and pressure distribution fields desired for fluid transport.
Figure 7B:
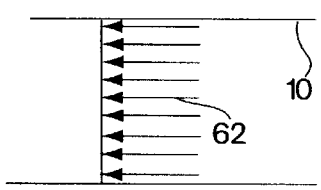
Figure 7C:
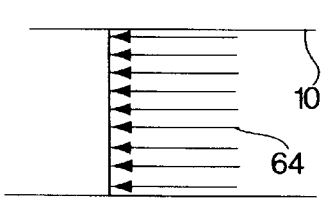

In order to promote better fluid transport, as illustrated in FIGS. 7A, 7B and 7C, a shear characteristic should be almost non-existent as illustrated at 60, whereas the velocity characteristic as illustrated at 62, and the pressure characteristic as illustrated at 64 should be made as uniform as possible across the cross section of conduit 10. This can be accomplished through the utilization of a pair of phased arrays 66 and 68 which serve to focus the energy at the focal point F which is on the center line 70 of conduit 10. This produces a pressure distribution as illustrated at 64' which is very nearly that associated with FIG. 7C. In order to accomplish this as illustrated at FIG. 7E, a waveform 72 is applied to the transducer array in which the voltage is very much greater than zero, with the voltage being centered upon the rest position of the transducers in the arrays.

Figure 7D:
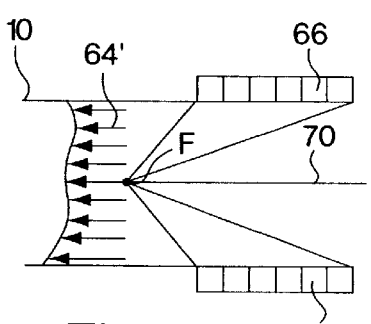
FIG. 7D is a diagrammatic illustration of the utilization of a phased array to focus energy to the center of the conduit utilized for the fluid transport, thereby to provide for the desired pressure distribution, velocity distribution, and shear distribution illustrated in FIGS. 7A, 7B and 7C.
Figure 7E:
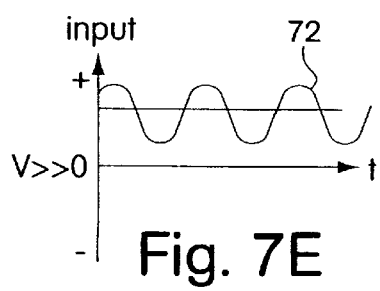
FIG. 7E is the waveform that associated with the mechanical energy imparted to the fluid via the arrays of FIG. 7D to produce the required improvement in fluid transport.
Figure 7F:
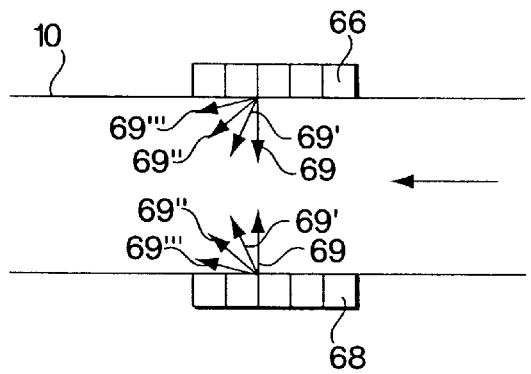
FIG. 7F is a diagrammatic illustration of the utilization of a pair of phased arrays to periodically alter the direction of the projected energy, partially for pumping purposes.

Referring now to FIG. 7F, the phased arrays of FIG. 7D may be used to dynamically vary the direction of the injected energy. Here arrays 66 and 68 are driven such that the direction of injection 69 can be varied in a periodic nature as illustrated at $69^1$, $69^{11}$, and $69^{111}$ to for instance have a pump effect. Moreover, this type of direction control can disentangle and align the long chain molecules more effectively to reduce viscosity. Moreover, this type of direction control can be used for controlling flow rate.

Because of the ability to dynamically change the direction of the injected energy, the subject system can be used to promote chemical reactions by in effect steering the injected energy to promote stirring. While energy has been injected into a fluid in the past for affecting chemical reaction, this has been in terms of a static field. In the subject invention a moving or dynamic field is established by the steering of the injected energy to stir the fluid and thus increase the chemical reaction.

What will be seen is that through various configurations of the transducers and the way in which they are driven, the physical properties of a fluid can be altered in a predetermined manner due to the coupling of the shear, velocity and pressure fields. It is therefore possible to specifically tailor the injected energy to maximize the desired result in a particular application.

Figure 8:
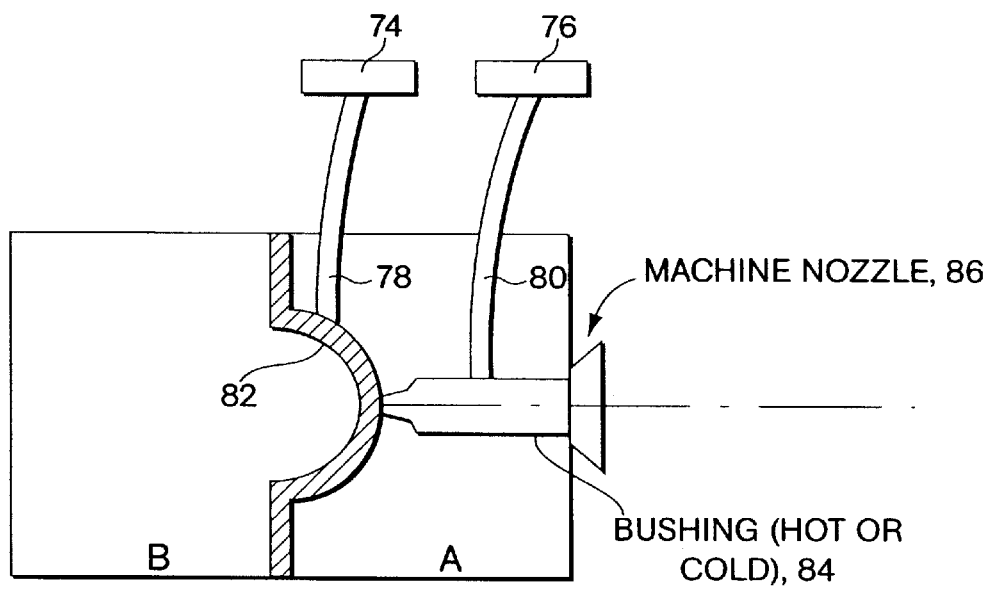
FIG. 8 is a cross sectional and diagrammatic illustration of two mold halves, with one of the mold halves being provided with injected energy both at the machine nozzle bushing and at a surface of one of the mold halves to promote filling of the mold through reduction of viscosity via the interaction of modified pressure, velocity and shear fields.

Referring now to FIG. 8, in an injection molding application it is sometimes desirable to provide the injected energy within the mold itself. In this case, mold halves A and B have transducers 74 and 76 respectively coupled via coupling shafts 78 and 80 to the mold cavity 82 and to the bushing 84 of the machine nozzle 86 provided in mold half A. What this means is that melt flow characteristics can be favorably altered within the mold cavity itself by providing linkages from the transducers to the areas within the mold cavity at which it is desirable to inject energy.

Figure 9:
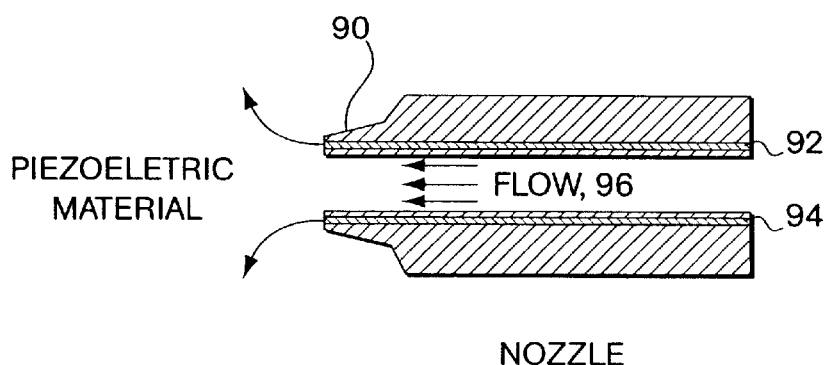
FIG. 9 is a cross sectional view of a conduit in which, rather than injecting mechanical energy at one point, mechanical energy is generated along the interior wall of the conduit, thereby to provide the required changes in the physical properties of the fluid passing therethrough.

Unlike prior art methods of injecting energy into fluid, and as illustrated in FIG. 9, a nozzle 90 may be provided with opposed linear arrays 92 and 94 of transducer elements, thereby to create a zone of energy which is elongated with a respect to the flow direction of the fluid, here illustrated by arrow 96.

Moreover, as illustrated in FIG. 10 a barrel 100 having a feedscrew 102 driven by a hydraulic or electrical motor 104 may be provided with a transducer 106 in a feedscrew 107 which passes under hopper 108 such that energy can be imparted to the injectable material as it melts due to the pressure of the feedscrew against the side of the barrel. Likewise, transducers 109 and 110 can be utilized in combination with transducer 106 to provide for the optimal distribution of energy to create for the required shear, velocity and pressure fields.

Referring now to FIG. 11, a manifold 120 may be provided with an inlet 122 surrounded by transducers 124 and 126. Runner 128 may be provided with energy internal to the manifold as illustrated by transducers 130 and 132 coupled to shafts 134 and 136 respectively. Additionally, transducers 138 and 140 can couple energy to exit nozzles 142 as illustrated. Thus, what is shown is that by tailoring of the energy injectable into the manifold, the flow properties through the manifold may be altered thus to promote easy filling of the mold.

As illustrated in FIG. 12, a manifold 150 it is shown with an inlet 152 having transducers 154 and 156 controlling the physical characteristics of the fluid therethrough. Inlet 152 is coupled to a runner 156 which is coupled to nozzles 158 and 160. As illustrated in FIG. 11, the physical characteristics in runner 156 can be altered through the utilization of a transducer 162 coupled to a shaft 164, whereas the characteristics of the fluid at the nozzle may be affected by transducers 166 and 168 positioned as illustrated.

Note that valve pins 170 and 172 normally utilized to gate melt through the nozzles may be provided with transducers 174 and 176, again to alter the physical characteristics of the melt therethrough, thus to promote melt filling.

Moreover, as illustrated in FIG. 13, a conduit 180 may be provided with a container 182 about which are embedded transducers 184 such that the container 182 may be viewed as a fluid processor in which the physical characteristics of the fluid moving through the container can be altered in a predetermined way, again by simultaneously configuring the shear, velocity and pressure fields generated by these transducers within container 184.

While the above has been described in connection with the molding of plastics, the subject invention also covers the use of injected energy into multiphase fluids such as metal powder mixed with a carrier, ceramics and both amorphous, semi-crystalline materials.

Moreover, in injection molding of thermosetting materials, since it is important not to exceed the thermosetting temperature, viscosity may be lowered with the subject technique without raising barrel or manifold temperature.

Additionally, for molding of colored plastics it is important that the colorant be distributed uniformly in the melt and the solidified product to prevent streaking or mottling. When viscosity is reduced by the injection of energy, the microshear field formed promotes better mixing.

As an additional feature of the subject invention, by applying injected energy during the hold time, cooling time or packing time when the part is solidifying or cooling, the part is stress relieved to minimize residual stress. Residual stress can cause distortion or warping of the part; or reduce the strength of the material.

It will thus be appreciated that the physical characteristics of a fluid can be significantly altered through the proper tailoring of the shear, velocity and pressure fields to achieve a maximal result for a predetermined application. The transducers can be utilized to provide energy either as a uniform field or as a field with a tailored distribution so that a variety of different by controllable affects can be achieved.

MARINE PROPELLER CAVITATION REDUCTION

Figure 14A:
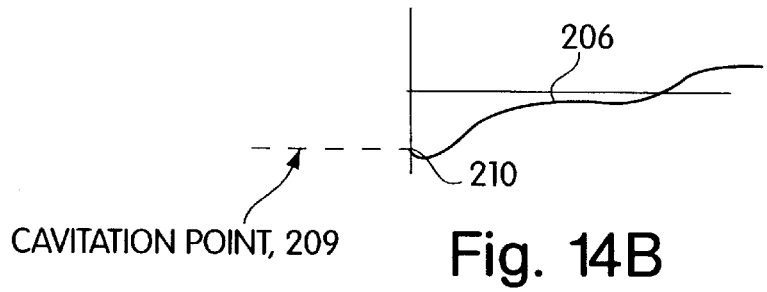
FIG. 14A is a cross sectional view of a blade of a ship's propeller.
Figure 14A:
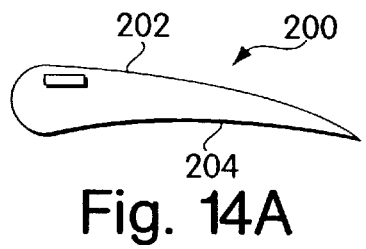

A problem long plaguing the marine industry is the problem of cavitation when the blade of a propeller loses its ability to produce forward thrust. The blade of a propeller, as illustrated in FIG. 14A by reference character 200 is shown to have an upper surface 202 and a lower surface 204, with the blade to provide lift in order to generate propulsion. As can be seen from the pressure curve 206 in FIG. 14B, the pressure at upper surface 202 dips below a cavitation pressure point 209 at point 210 or curve 206, at which cavitation is induced.

Figure 14C:
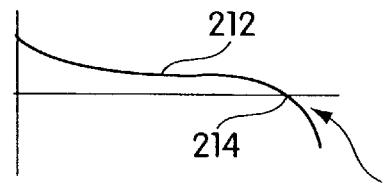

Likewise, in FIG. 14C pressure curve 212 for surface 204 of blade 200 goes negative at 214 at the trailing edge of the lower surface of the blade. This likewise causes cavitation.

Figure 15A:
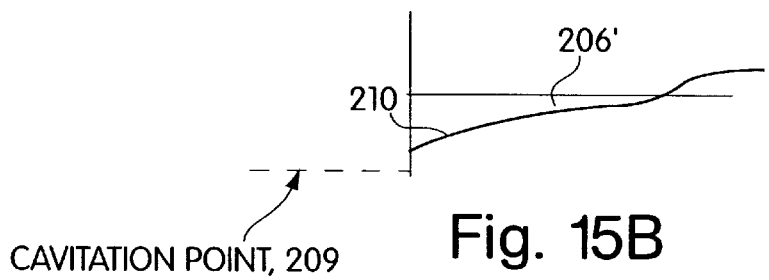
FIG. 15A is a diagrammatic illustration of the blade at FIG. 14A illustrating the utilization of transducers at the leading edge of the upper surface of the blade and the trailing edge of the lower surface of the blade to limit cavitation through the injection of energy adjacent these two transducers.
Figure 15A:
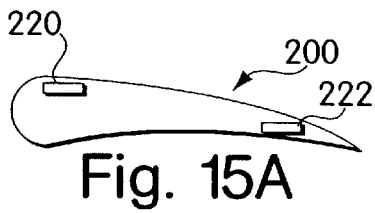
Figure 15C:
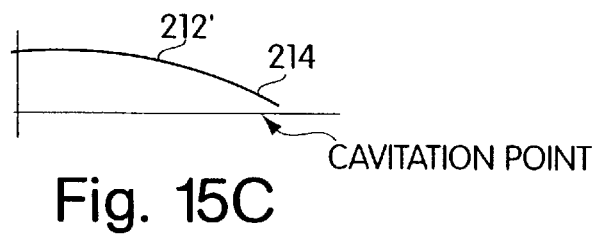

In contradistinction to the situation depicted in FIGS. 14A, B and C, as illustrated in FIG. 15A blade 200 is provided with transducers 220 and 222 respectively at the leading portion of the upper surface of the blade and at the trailing portion of the lower surface of the blade. As seen in FIG. 15B, the resulting pressure curve 206' for the upper surface of the blade shows an increase in pressure at point 210 above cavitation pressure point 209 when the appropriate frequency and amplitude of energy is transmitted from transducer 220 into the surrounding water. Likewise as can be seen in FIG. 15C, from point 214 on pressure curve 212', the pressure at the trailing edge of the blade is increased above the cavitation point through the injection of energy at the appropriate frequency and amplitude into the surrounding water.

It will be appreciated that rather than locating transducers on or in the blade itself, transducers may be utilized on a blade shroud, in which phased arrays can focus energy onto the appropriate part of the blade, with the phased array driven to track the blade movement.

It will thus be noted that the propensity for a propeller to cavitate can be significantly altered by altering the physical characteristics of the water adjacent the blades of the propeller. This can be accomplished through the injection of a mechanically generated periodic wave into the water surrounding the propeller so as to increase pressure at the top surface of the leading edge of the blade of the propeller and at the trailing edge of the bottom surface of this blade.

ADVANTAGES IN FLUID TRANSPORT

The subject invention can be used in fluid transport as a means of controlling flow rate. It will be appreciated that external pressure can not be added or increased in many applications, while applying external pressure is a major means of controlling flow rate. These fluids may vary from application to application. Typically they include human body fluid, oil/petroleum, and water. They may be Newtonian or non-Newtonian fluids. Applying high pressure to maintain a steady flow is not always the most economic solution. For example, the Alaska Oil Pipeline, running from Prodhoe Bay to Valdez, is about 800 miles long, transports 88,000 barrels of oil every hour, has 12 pump stations and experienced 1993 operating costs of $541.8 million. The major portion of this cost is due to the requirement of applying and maintaining high pressure for flow. If another technology can reduce the required number of pump stations, operating cost can be cut down dramatically.

Also, applying pressure is not always a feasible solution. For example, in human body fluid transport, such as blood injection, external pressure has a maximum limit exceeding which will cause damage to the human body or body fluid. This upper limit has the practical effect of limiting the rate of fluid transport, such that it sometimes takes a long period of time to finish the operation.

The subject invention increases flow rate without applying external pressure. Instead, it creates and controls dynamic pressure inside the fluid. This dynamic pressure can act as a pump which can be used for controlling flow rate. In FIG. 7F, a pair of phased arrays is used to change the pressure distribution by steering mechanical wave energy at different angles. The maximum flow rate can be achieved by steering both arrays in the same direction as the flow. The minimum flow rate can be achieved by steering both waves in the opposite direction as the flow direction. Each steering angle corresponds to a certain flow rate. Thus, by changing the steering angle, different flow rates can be achieved. Pipelines or conduits built with this technology can be used in oil transport, water transport, co-injection and molding. Without applying external pressure, the subject technique can save cost and energy while providing flexibility for control.

Furthermore, if the fluid is non-Newtonian fluid, the dynamic micro-shear field created can be used for viscosity control and thus further flow rate control, beside the dynamic pressure field. By controlling the dynamic micro-shear field, the viscosity of the fluid can be reduced and thus the fluid can flow easily. Combining with the effect of Dynamic Pressure, the subject invention provides a way of controlling flow rate in fluid transport, which includes but is not limited to oil, plastics melts, pulp, and water.

ADVANTAGES IN THE INJECTION MOLD APPLICATIONS

While the subject invention is not limited to providing advantages in the molding industry, the following molding example is presented by way of illustration. It will be appreciated in any molding process one critical parameter is the viscosity of the molten material injected into the mold. In general, the molten material comes from pellets of plastic, usually long chain polymers, in which the pellets are forced by a feedscrew in a barrel towards the runners of the mold, with shear forces inducing friction at the walls of the barrel that provides heat to melt the plastic pellets which form the raw material utilized in the molding process. In addition to the heat produced by the shear induced by the feedscrew, heat is applied both at the barrel and runner to control the viscosity of the molten injected into the mold.

In the past in order to lower the viscosity of the long chain polymers, heat is directly applied to the material in the barrel to lower the viscosity of the molten material. While heat alone to a certain extent can control the viscosity of the molten material, it is only with difficulty that the viscosity of the molten material can be made low enough by heating it for easy mold filling while at the same time keeping the temperature of the heated material within the setup temperatures and processing window for the particular polymer.

Note that it is important to keep the mold cold so that the parts made by the molding process can solidify rapidly. In general, running the mold at a reduced temperature reduces the cycle times. In order to do this, the temperature of the injected material must be kept as low as possible. It will be appreciated that as much as a ten degree Fahrenheit reduction in melt temperature can triple the throughput of the molding process.

Additionally, if it were possible to reduce the temperature of the molten material while at the same time maintaining a low viscosity, burning of the material which regularly occurs in the heating process to obtain suitable viscosity would be eliminated.

Moreover, the amount of energy expended in heating the raw material in the barrel and in heating the runner system, if reducible, would save a considerable amount of cost.

Furthermore, if the change in temperature from barrel to mold is great, warping, blushing and discoloration occurs. There is therefore a need to reduce viscosity while at the same time reducing the temperature of the injected melt.

Additionally, in an effort to increase viscosity by increasing the temperature of the molten material, material degradation occurs in the part itself. It will be appreciated that polymers have a fixed setup temperature. If in an effort to increase viscosity the temperature exceeds the setup temperature for the polymer, the molded parts are burned. It is therefore important in any molding process to keep the temperatures below the upper limit of the process window. In practice, the temperature of the barrel is sometimes set to the upper limit of this window. The problem with setting the temperature at the upper limit of the window is that it is very difficult to control the temperature throughout the entire system. One then gets hot spots which exceed the setup temperature for the material, causing the aforementioned burning. It is therefore desirable to provide a system which yields low viscosity and reduced temperatures. Further, it is useful to make the viscosity throughout the entire molding process uniform to reduce both hot spots and cold spots and to do so without raising temperatures.

As an additional consideration, in the polymer industry it has been found that the higher molecular weight of the material, the better are the mechanical properties of the molded part. However, with high molecular weight comes exceedingly high viscosity. Thus, while it is desirable to be able to mold high molecular weight polymers due to the desirable mechanical properties of these polymers, the high viscosity and the lack of ability to control it precludes the utilization of some of these polymers in applications which require them. Thus there is a need to reliably lower the viscosity of such materials during the molding process, and to do so without raising temperatures.

Finally, in the polymer industry there is problem of molten fracture. This occurs when viscosity is too high and the amount of energy applied to the feedscrew is excessive. When the viscosity is too high, the feedscrew generates too much friction which raises the molten material above its highest design temperature. The result is a roughened surface for the part which is both unsightly and in some cases causes the part to fail. It has been found that merely raising the temperature of the molten material so as to reduce viscosity does not eliminate the problem of molten fracture.

In summary, for molding scenarios, while careful temperature balancing techniques have been utilized in the past to control the viscosity of the melt from the barrel through the runners and into the mold cavities, it is only with difficulty that the viscosity can be controlled at all through the application of heat, much less reduce the heat to a point where it causes no harm.

For other scenarios in which physical properties such as viscosity are critical, the ability to alter the physical properties of the material in a relatively permanent inexpensive way without additives is important.

ADVANTAGES IN CHEMICAL/BIOLOGICAL APPLICATION

The subject invention can be used for accelerating chemical/biological reactions. Even though ultrasound has been used in the past for these applications, ultrasound was not controlled, eg, the direction of ultrasound and the distribution of ultrasound are all not changeable. The field introduced by conventional ultrasound apparatus is a static field, which has very limited variations. Due to the fixed distribution, some spots become "dead spots" where ultrasound agitation is always very small such that the reaction at these dead spots is always very slow. The subject invention breaks throughout this limitation and provides a means for creating and controlling dynamic fields whose distribution and intensity are all varied in real time. By steering the direction of mechanical waves, the subject invention is able to scan through every point in the concerned area so that "dead spots" caused by conventional processing methods are eliminated. Moreover, this real-time steering makes the reaction rate uniform across the whole area.

Additionally, the subject invention can specifically accelerate the reaction rate at some specific points by focusing energy into these points. These points may change in real time, which is beyond the capability of traditional methods.

An application example is in brewery industry, where the subject invention can be used to reduce cycle time and thus increase profit.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for reducing cavitations of a marine propeller, comprising the steps of:
   locating a mechanical wave generating transducer at the leading edge of said propeller; and,
   driving said transducer with a periodic signal to produce energy in the 1 KHz to 10 MHz range, whereby pressure at said leading edge of said propeller is increased to reduce cavitations.

2. The method of claim 1, and further including locating a second transducer at the trailing edge of said propeller.

3. A method for improving the flow characteristics of a marine propeller, comprising the steps of:
   locating a mechanical wave generating transducer at said propeller; and,
   driving said transducer with a periodic signal to produce energy in the 1 KHz to 10 MHz range, whereby pressure across said propeller is controlled to improve flow.

4. The method of claim 3, wherein said transducer includes a phased array and wherein the phasing of said phased array is used to control flow over said propeller.

5. The method of claim 3, wherein said propeller has a leading edge and wherein said transducer is at said leading edge.

6. The method of claim 3, wherein said propeller has a trailing edge and wherein said transducer is at said trailing edge.

7. The method of claim 6, wherein the opening angle at the trailing edge is changed based on the output of said transducer.

8. The method of claim 3, wherein the flow characteristic controlled by said transducer alters the properties of said propeller.

9. The method of claim 8, wherein one of said properties is lift.

10. The method of claim 8, wherein one of said properties is pitch.

11. The method of claim 8, wherein one of the properties is thrust.

12. The method of claim 8, wherein one of said properties is drag.

13. The method of claim 3, wherein said propeller is shrouded and wherein said transducer is in said shroud.

14. A method for improving the flow characteristics of a marine foil, comprising the steps of:

locating a mechanical wave generating transducer at said foil; and, driving said transducer with a periodic signal to produce energy in the 1 KHz to 10 MHz range, whereby pressures across said foil are controlled to improve flow.

\* \* \* \* \*